(12) United States Patent
Chen

(10) Patent No.: US 11,502,538 B2
(45) Date of Patent: Nov. 15, 2022

(54) X CAPACITOR DISCHARGING CIRCUIT AND METHOD THEREOF

(71) Applicant: Chengdu Monolithic Power Systems Co., Ltd., Chengdu (CN)

(72) Inventor: Yuedong Chen, Chengdu (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 291 days.

(21) Appl. No.: 16/927,687

(22) Filed: Jul. 13, 2020

(65) Prior Publication Data

US 2021/0036541 A1 Feb. 4, 2021

(30) Foreign Application Priority Data

Aug. 1, 2019 (CN) .......................... 201910705470.0

(51) Int. Cl.
| | |
|---|---|
| *H02J 7/34* | (2006.01) |
| *H02J 7/00* | (2006.01) |
| *H02M 1/32* | (2007.01) |
| *H02M 1/44* | (2007.01) |
| *H02M 7/06* | (2006.01) |

(52) U.S. Cl.
CPC ............ *H02J 7/345* (2013.01); *H02J 7/0047* (2013.01); *H02M 1/32* (2013.01); *H02M 1/44* (2013.01); *H02J 2207/10* (2020.01); *H02J 2207/50* (2020.01); *H02M 1/322* (2021.05); *H02M 7/06* (2013.01)

(58) Field of Classification Search
CPC ...... H02J 7/345; H02J 7/0047; H02J 2207/10; H02J 2207/50; H02M 1/32; H02M 1/44; H02M 1/322; H02M 7/06
See application file for complete search history.

(56) References Cited

U.S. PATENT DOCUMENTS

| | | | |
|---|---|---|---|
| 8,541,987 B2 | 9/2013 | Don | |
| 9,148,049 B2 | 9/2015 | En | |
| 9,201,102 B2 | 12/2015 | Siran | |
| 2013/0027999 A1* | 1/2013 | Ptacek | H02M 1/36 363/126 |
| 2017/0187217 A1* | 6/2017 | Gong | H02M 1/126 |
| 2018/0198363 A1* | 7/2018 | Watanabe | H02M 1/126 |
| 2019/0238058 A1 | 8/2019 | Siran | |

* cited by examiner

*Primary Examiner* — Richard Isla
*Assistant Examiner* — Johali A Torres Ruiz
(74) *Attorney, Agent, or Firm* — Perkins Coie LLP

(57) ABSTRACT

A discharge circuit for an X capacitor has a first voltage detection circuit providing a first indicating signal based on a voltage across two input terminals of a switching converter to indicate whether the two input terminals are connected to an AC power source, and a discharge module starting a discharge operation on the X capacitor based on first indicating signal, and the discharge operation discharges the X capacitor during a first time period, and stops discharging the X capacitor and compares a sampled signal with the voltage across the two input terminals during a following second time period.

13 Claims, 9 Drawing Sheets

US 11,502,538 B2

X CAPACITOR DISCHARGING CIRCUIT AND METHOD THEREOF

This application claims the benefit of CN application No. 201910705470.0, filed on Aug. 1, 2019, and incorporated herein by reference.

TECHNICAL FIELD

The present invention relates to electrical circuit, more particularly but not exclusively relates to X capacitor discharging circuit and method.

BACKGROUND

An EMI filter is needed at input terminals of a switching converter to suppress electromagnetic interference. The EMI filter usually has at least one capacitor coupled between the input terminals of the switching converter, and the at least one capacitor is also known as safety capacitor, or X capacitor. When the switching converter is disconnected from a power source, a voltage across the X capacitor should be reduced to a safe value within a specified time period. Otherwise, the voltage across the X capacitor will pose a safety risk to those who touch the switching converter after disconnected from the power source. Therefore, it is necessary to propose a safe, reliable and efficient discharging circuit and discharging method for X capacitor.

SUMMARY

It is one of the objects of the present invention to provide an X capacitor discharging circuit and method with low power loss, high efficiency and high security.

One embodiment of the present invention discloses a discharge circuit for an X capacitor, the X capacitor is coupled between two input terminals of a switching converter, the discharge circuit comprising: a first voltage detection circuit, configured to provide a first indicating signal based on a voltage across the two input terminals of the switching converter, to indicate whether the two input terminals of the switching converter are connected to an AC power source; and a discharge module, coupled to the first voltage detection circuit to receive the first indicating signal, wherein when the first indicating signal indicates that the two input terminals of the switching converter are disconnected from the AC power source, the discharge module starts a discharge operation on the X capacitor; wherein the discharge operation comprises providing a sampled signal via sampling the voltage across the two input terminals of the switching converter, discharging the X capacitor during a first time period, and stopping discharging the X capacitor and comparing the sampled signal with the voltage across the two input terminals of the switching converter to judge whether the two input terminals of the switching converter are connected to the AC power source or a DC power source during a following second time period.

Another embodiment of the present invention discloses a discharge method for an X capacitor, the X capacitor is coupled between two input terminals of a switching converter, the discharge method comprising: detecting whether the two input terminals of the switching converter are connected to an AC power source; starting a discharge operation on the X capacitor if the two input terminals of the switching converter are detected as being disconnected from the AC power source; wherein the discharge operation further comprises providing a sampled signal via sampling a voltage across the two input terminals of the switching converter, discharging the X capacitor during a first time period, and stopping the discharging of the X capacitor and judging whether the two input terminals of the switching converter are connected to the AC power source or a DC power source based on the sampled signal and the voltage across the two input terminals of the switching converter during a following second time period.

Yet another embodiment of the present invention discloses a discharge circuit for an X capacitor, the X capacitor is coupled between two input terminals of a switching converter, the discharge circuit comprising: a first voltage detection circuit, configured to provide a first indicating signal based on a voltage across the two input terminals of the switching converter to indicate whether the two input terminals of the switching converter are connected to an AC power source; a second voltage detection circuit, configure to sample the voltage across the two input terminals of the switching converter under control of a sample control signal, and configured to generate a sampled signal accordingly, the second voltage detection circuit is further configured to provide a second indicating signal based on the sampled signal and the voltage across the two input terminals of the switching converter; and a discharge component, configured to discharge the X capacitor under control of a discharge control signal; wherein the discharge circuit is configured to start a discharge operation on the X capacitor when the first indicating signal indicates that the two input terminals of the switching converter are connected to the AC power source.

BRIEF DESCRIPTION OF THE DRAWINGS

Non-limiting and non-exhaustive embodiments are described with reference to the following drawings.

DETAILED DESCRIPTION

In the present application, numerous specific details are described to provide a thorough understanding of the present invention, such as examples of circuits, components, and methods. These embodiments illustrated are exemplary, not to confine the scope of the invention. A person ordinary skilled in the art will recognize, however, that the invention can be implemented without one or more of the specific details. In other instances, well-known details are not shown or described to avoid obscuring the aspects of the invention. Some phrases are used in some exemplary embodiments. However, the usage of these phrases is not confined to these embodiments.

Figure 1:
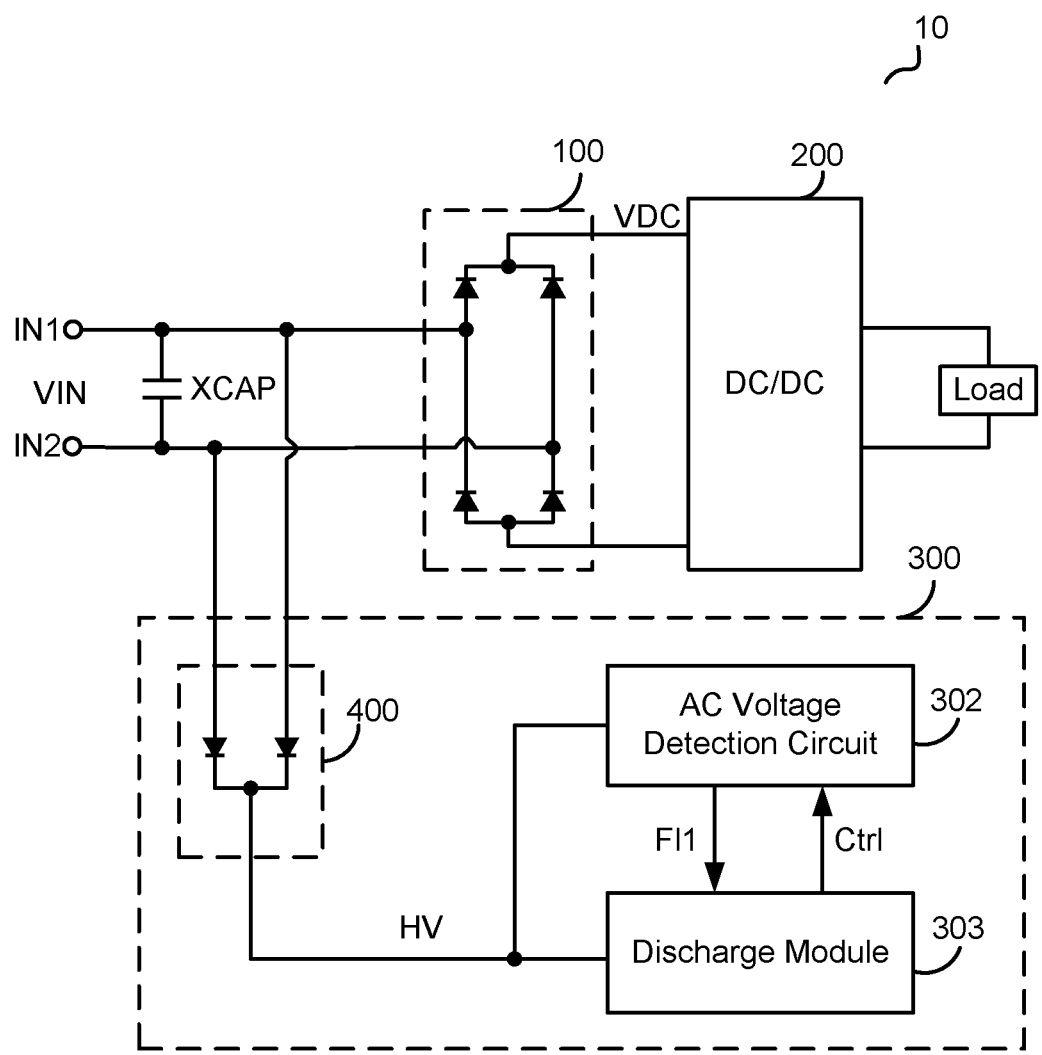
FIG. 1 schematically illustrates a circuit block diagram of a switching converter 10 according to an embodiment of the present invention.

FIG. 1 schematically illustrates a circuit block diagram of a switching converter 10 according to an embodiment of the present invention. As shown in FIG. 1, switching converter 10 comprises an X capacitor XCAP, a rectifier circuit 100, a DC/DC (direct current to direct current) circuit 200, and a discharge circuit 300. X capacitor is coupled between input terminals IN1 and IN2 of switching converter 10. Input terminals IN1 and IN2 receive an input voltage VIN from a direct current (DC) power source or an alternate current (AC) power source, rectifier circuit 100 converts input voltage VIN to a DC voltage VDC, and a specified DC voltage is provided to a load through conversion of DC/DC circuit 200.

In one embodiment, discharge circuit 300 comprises a rectifier circuit 400. Discharge circuit 300 is coupled to input terminals IN1 and IN2 of switching converter 10 through rectifier circuit 400. Rectifier circuit 400 comprises a first input terminal, a second input terminal and an output terminal, wherein the first input terminal and the second input terminal of rectifier circuit 400 are respectively coupled to input terminals IN1 and IN2 of switching converter 10, the output terminal of rectifier circuit 400 is configured to provide a rectification voltage HV via rectifying a voltage across input terminals IN1 and IN2 of switching converter 10.

Discharge circuit 300 further comprises an AC voltage detection circuit 302, and a discharge module 303. An input terminal of AC voltage detection circuit 302 is coupled to the output terminal of rectifier circuit 400 to receive rectification voltage HV, and an output terminal of AC voltage detection circuit 302 is configured to provide a first indicating signal FI1 to indicate whether input terminals IN1 and IN2 of switching converter 10 is connected to the AC power source according to the voltage across input terminals IN1 and IN2 of switching converter 10. Discharge module 303 is coupled to AC voltage detection circuit 302 to receive the first indicating signal FI1. When the first indicating signal FI1 indicates that input terminals IN1 and IN2 of switching converter 10 are disconnected from the AC power source, discharge module 303 performs a discharge operation on X capacitor XCAP.

In one embodiment, discharge module 303 further provides a detecting control signal Ctrl to AC voltage detection circuit 302, AC voltage detection circuit 302 is configured to conduct voltage detection on the voltage across input terminals IN1 and IN2 under control of detecting control signal Ctrl.

Figure 2:
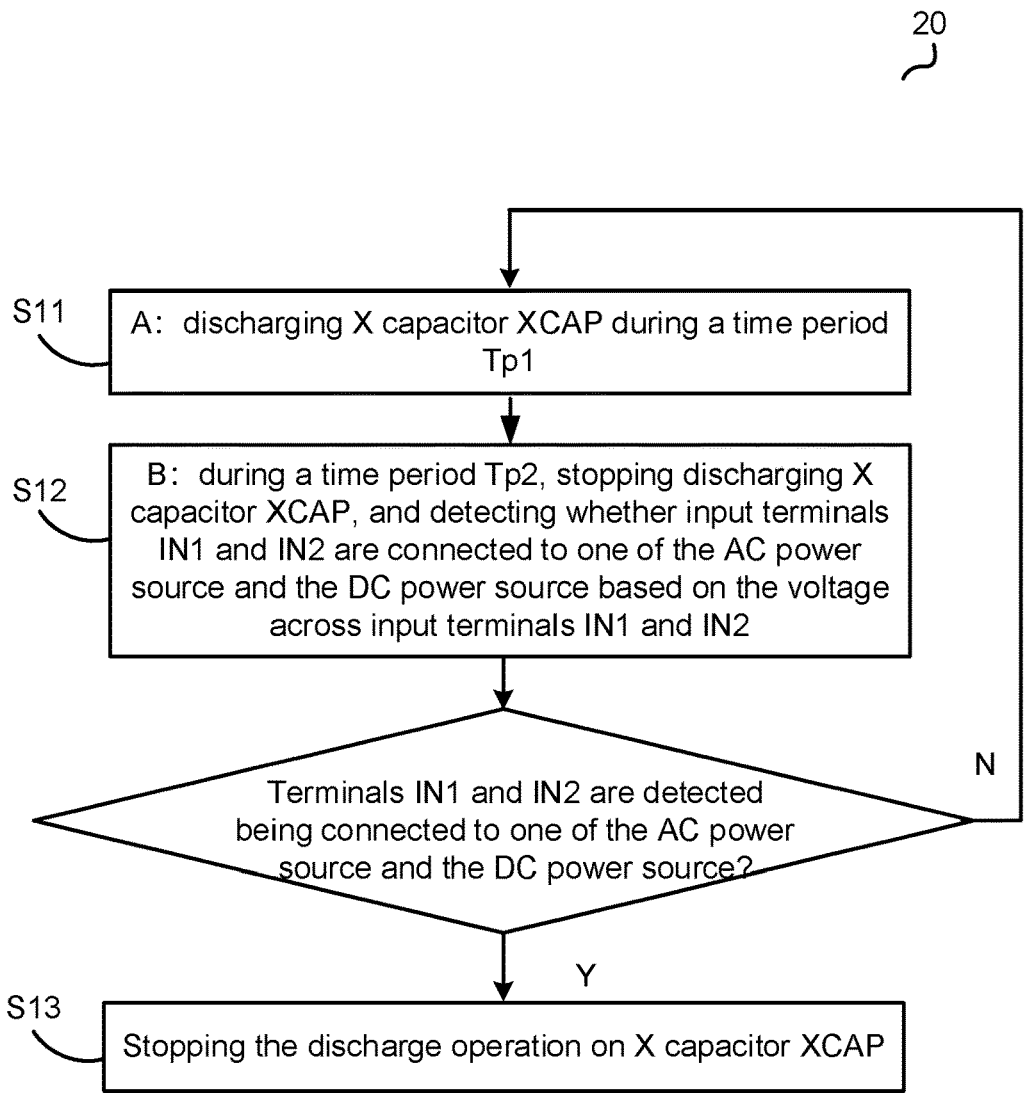
FIG. 2 shows a flow chart 20 of a discharge operation for X capacitor XCAP of a discharge module 303 according to an embodiment of the present invention.

FIG. 2 shows a flow chart 20 for the discharge operation on X capacitor XCAP according to an embodiment of the present invention. Flow chart 20 comprises steps S11-S13, and the discharge protection comprises repeated sequences A-B shown in steps S11-S12.

Step S11 comprises sequence A: discharging X capacitor XCAP during a time period TP1.

Step S12 comprises sequence B: during a time period TP2, stopping discharging X capacitor and detecting whether input terminals IN1 and IN2 are connected to a power source, e.g., the AC power source or the DC power source based on the voltage across input terminals IN1 and IN2.

When terminals IN1 and IN2 are detected being connected to the power source, stopping the repeated sequences A-B, go to step S13, i.e., stopping the discharge operation on X capacitor XCAP. Otherwise, go to step S11, continuing the repeated sequences A-B.

The discharge operation disclosed by embodiments of the present invention discharges X capacitor XCAP after input terminals IN1 and IN2 disconnected from the AC power source, and then stops discharge X capacitor XCAP and checks whether input terminals IN1 and IN2 are connected to one of the AC power source and the DC power source. Thus embodiments of the present invention can avoid false triggering of the discharge operation, have high reliability, low power dissipation and high efficiency.

Figure 3:
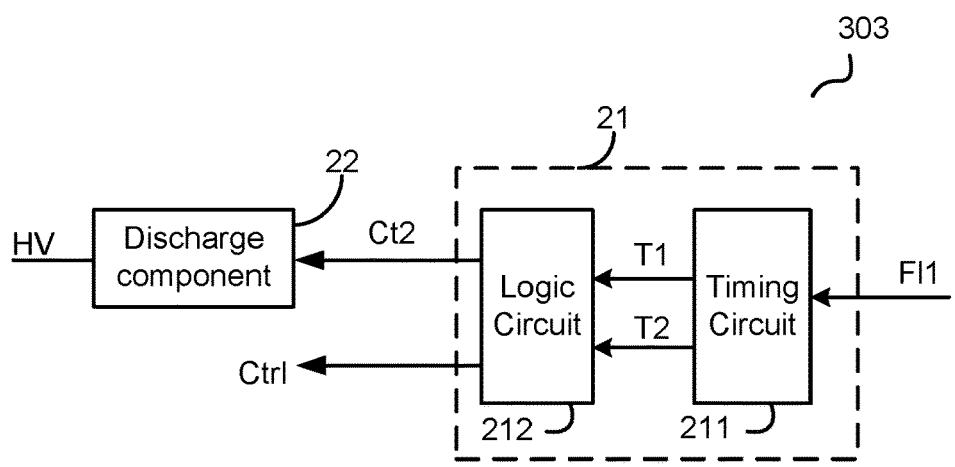
FIG. 3 schematically illustrates a circuit block diagram of discharge module 303 according to an embodiment of the present invention.

FIG. 3 schematically illustrates a circuit block diagram of discharge module 303 according to an embodiment of the present invention. As shown in FIG. 3, discharge module 303 further comprises a timing logic circuit 21 and a discharge component 22. Timing logic circuit 21 is coupled to AC voltage detection circuit 302 to receive the first indicating signal FI1, and is configured to provide a discharge control signal Ct2 and detecting control signal Ctrl based on the first indicating signal FI1. Discharge component 22 is configured to discharge X capacitor XCAP under control of discharge control signal Ct2. AC voltage detection circuit 302 is configured to detect the voltage across input terminals IN1 and IN2 under control of detecting control signal Ctrl. In one embodiment, timing logic circuit 21 comprises a timing circuit 211 and a logic circuit 212. Timing circuit 211 is configured to provide a first timing signal T1 and a second timing signal T2 based on the first indicating signal FI1. Logic circuit 212 is configured to provide discharge control signal Ct2 and detecting control signal Ctrl based on the first timing signal T1 and the second timing signal T2.

Figure 4:
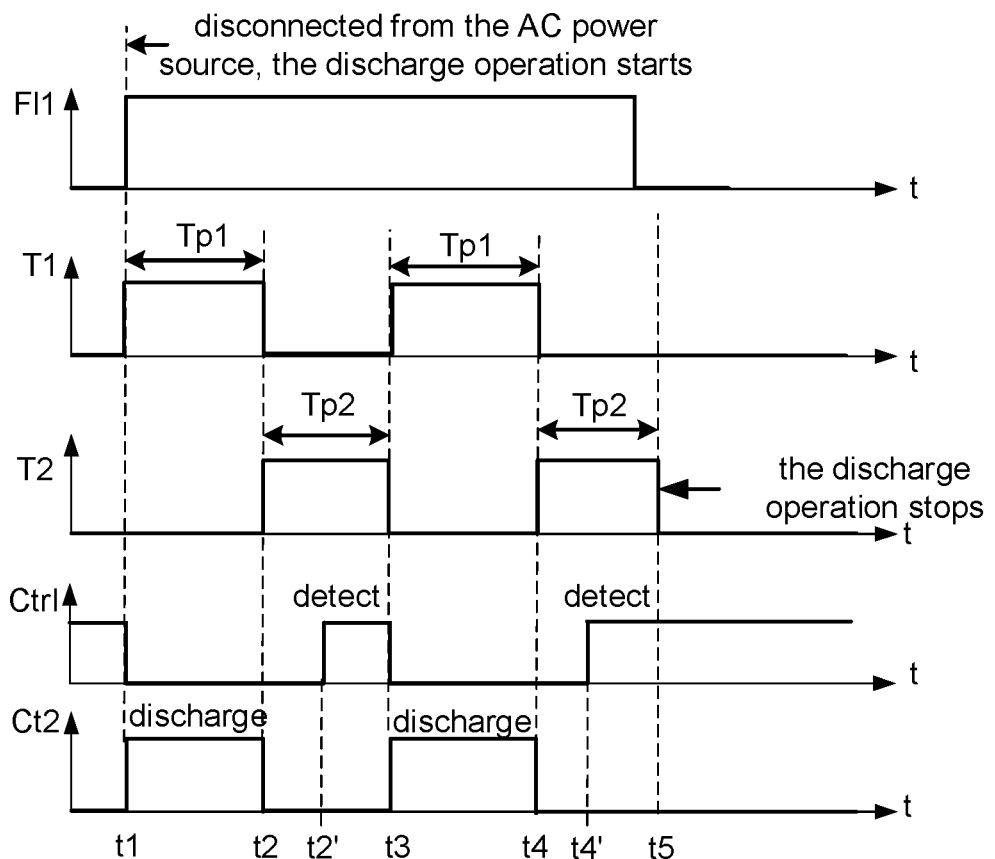
FIG. 4 shows waveforms of discharge module 303 shown in FIG. 3 according to an embodiment of the present invention.

FIG. 4 shows waveforms of discharge module 303 shown in FIG. 3 according to an embodiment of the present invention. The waveforms in FIG. 4 shows the first indicating signal FI1, the first timing signal T1, the second timing signal T2, detecting control signal Ctrl, and discharge control signal Ct2 from top to below. In the embodiment shown in FIG. 4, when switching converter 10 works normally, detecting control signal Ctrl is at logic high, AC voltage detection circuit 302 is configured to detect the voltage across input terminals IN1 and IN2 and update the first indicating signal FI1 accordingly. At time t1, the first indicating signal FI1 transits to at logic high, which indicates that switching converter 10 is disconnected from the AC power source, and discharge module 303 starts the discharge operation on X capacitor XCAP. Timing circuit 211 starts timing, the first timing signal T1 becomes at logic high, discharge control signal Ct2 becomes at logic high, discharge component 22 starts discharging X capacitor XCAP, detecting control signal Ctrl becomes at logic low, AC voltage detection circuit 302 stops detect the voltage across input terminals IN1 and IN2. At time t2, the first time period Tp1 during which the first timing signal T1 remaining at logic high equals a first predetermined time period, then the first timing signal T1 becomes at logic low, the second timing signal T2 becomes at logic high, discharge control signal Ct2 becomes at logic low, discharge component 22 stops discharging X capacitor XCAP. At the following time t2', detecting control signal Ctrl becomes at logic high, AC voltage detection circuit 302 is configured to detect the voltage across input terminals IN1 and IN2 and update the first indicating signal FI1 accordingly, timing logic circuit 21 is configured to judge whether input terminals IN1 and IN2 are connected to the AC power source based on the first indicating signal FI1. In one embodiment, there is an interval between time t2 and time t2'. At time t3, the second time period Tp2 during which the second timing signal T2 remaining at logic high equals a second predetermined time period, the second timing signal T2 becomes at logic low. The second time period Tp2 is a time period during which discharge component 22 stopping discharging X capacitor XCAP. In the embodiment shown in FIG. 4, during a detecting time period between time t2' and time t3, the first indicating signal FI1 is at logic high, input terminals IN1 and IN2 are still disconnected from the AC power source, timing circuit 211 restarts timing again after the second timing signal T2 becomes at logic low. Then repeat above operation, the first timing signal T1 becomes at logic high, discharge control signal Ct2 becomes at logic high, detecting control signal Ctrl becomes at logic low, discharge component 22 starts discharging X capacitor XCAP, AC voltage detection circuit 302 stops detect the voltage across input terminals IN1 and IN2. At time t4, the first time period Tp1 during which the first timing signal T1 remaining at logic high equals the first predetermined time period, then the first timing signal T1 becomes at logic low, the second timing signal T2 becomes at logic high, discharge control signal Ct2 becomes at logic low, discharge component 22 stops discharging X capacitor XCAP. At the following time t4', detecting control signal Ctrl becomes at logic high, AC voltage detection circuit 302 is configured to detect the voltage across input terminals IN1 and IN2 and update the first indicating signal FI1 accordingly, timing logic circuit 21 is configured to judge whether input terminals IN1 and IN2 are connected to the AC power source based on the first indicating signal FI1. At time t5, the second time period Tp2 during which the second timing signal T2 remaining at logic high equals the second predetermined time period, the second timing signal T2 becomes at logic low. In the embodiment shown in FIG. 4, during a time period between time t4' and time t5, the first indicating signal FI1 becomes at logic low, it is judged that input terminals IN1 and IN2 are connected to the AC power source, timing circuit 211 stops, and the discharge operation stops. In one embodiment, the first predetermined time period and the second predetermine time period may be constant or programmable.

Figure 5:
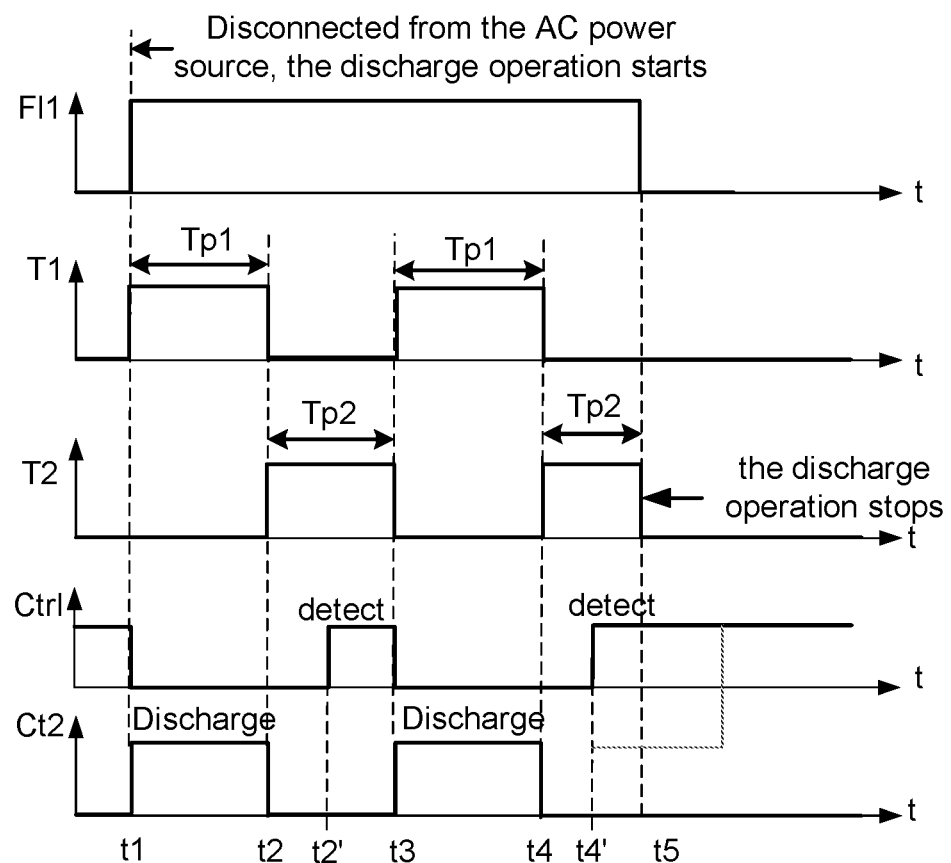
FIG. 5 shows waveforms of discharge module 303 shown in FIG. 3 according to another embodiment of the present invention.

FIG. 5 shows waveforms of discharge module 303 shown in FIG. 3 according to another embodiment of the present invention. Different from FIG. 4, in the embodiment shown in FIG. 5, when detecting control signal Ctrl is at logic high, timing circuit 211 stops timing and discharge component 22 stops discharging X capacitor XCAP immediately once it is judged that input terminals IN1 and IN2 are connected to the AC power source, e.g., the first indicating signal FI1 becomes at logic low.

Figure 6:
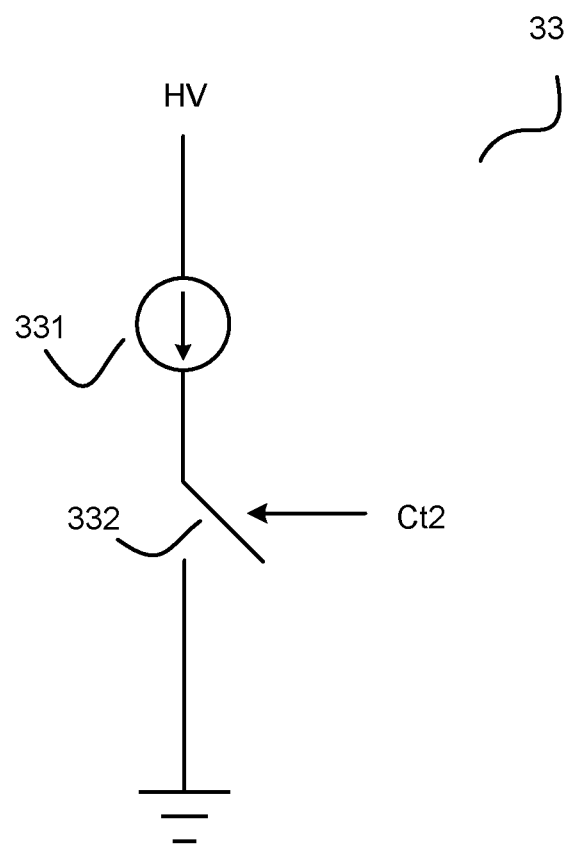
FIG. 6 schematically illustrates a circuit block of a discharge component 33 according to an embodiment of the present invention.

FIG. 6 schematically illustrates a circuit block of a discharge component 22 according to an embodiment of the present invention. In FIG. 6, discharging component 22 comprises a discharging current source 331 and discharging switch 332 coupled in serial between rectifier voltage HV and a reference ground. Discharging switch 332 is turned ON and OFF based on discharge control signal Ct2. In one embodiment, when discharge control signal Ct2 is at a first state, e.g., at logic high, discharging switch 332 is turned ON, discharging current source 331 discharges X capacitor XCAP through discharge switch 332.

Figure 7:
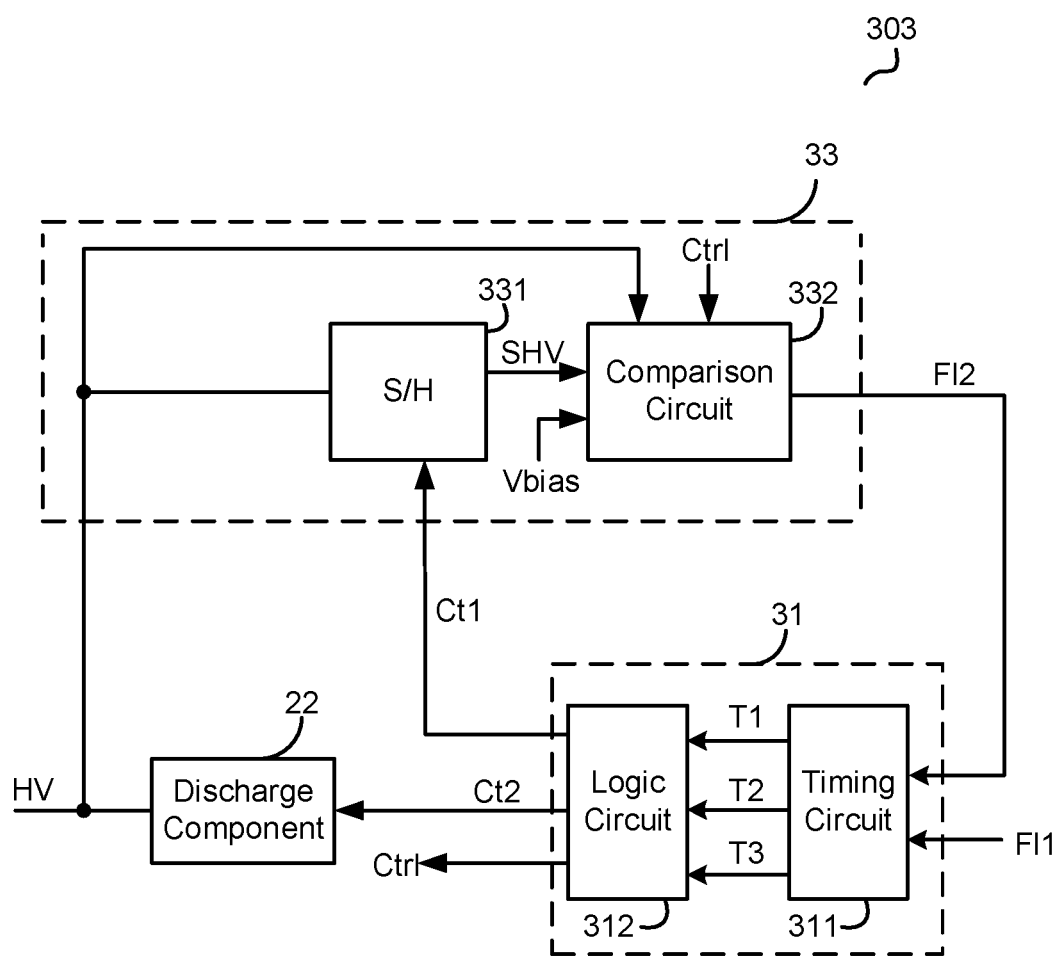
FIG. 7 schematically illustrates a circuit block diagram of discharge module 303 according to another embodiment of the present invention.

FIG. 7 schematically illustrates a circuit block diagram of discharge module 303 according to another embodiment of the present invention. In FIG. 7, discharge module 303 further comprises a timing logic circuit 31, discharge component 22, and a DC voltage detection circuit 33. Timing logic circuit 31 has a first input terminal, a second input terminal, a first output terminal, a second output terminal, and a third output terminal, wherein the first input terminal of timing logic circuit 31 is coupled to AC voltage detection circuit 302 to receive the first indicating signal FI1, the second input terminal of timing logic circuit 31 is configured to receive a second indicating signal FI2, the first output terminal of timing logic circuit 31 is configured to provide discharge control signal Ct2, the second output terminal of timing logic circuit 32 is configured to provide sample control signal Ct1, and the third output terminal of timing logic circuit 32 is configured to provide detecting control signal Ctrl. The input terminal of discharge component 22 is coupled to the first output terminal of timing logic circuit 31 to receive discharge control signal Ct2, and the output terminal of discharge component 22 is coupled to one terminal of X capacitor XCAP through rectifier circuit 400. Discharge component 22 is configured to discharge X capacitor XCAP based on discharge control signal Ct2. DC voltage detection circuit 33 has a first input terminal, a second input terminal, a third input terminal and an output terminal, wherein the first input terminal of DC voltage detection circuit 33 is coupled to input terminals IN1 and IN2 through rectifier circuit 400, the second input terminal of DC voltage detection circuit 33 is coupled to the second input terminal of timing logic circuit 32 to receive sample control signal Ct1, the third input terminal of DC voltage detection circuit 33 is configured to receive detecting control signal Ctrl, and the output terminal of DC voltage detection circuit 33 is coupled to the second input terminal of timing logic circuit 31 to provide the second indicating signal FI2. DC voltage detection circuit 33 is configured to detect whether input terminals IN1 and IN2 are connected to the DC power source and provide the second indicating signal FI2 accordingly. When the second indicating signal FI2 indicates that input terminals IN1 and IN2 are connected to the DC power source, discharge component 22 is controlled by discharge control signal Ct2 to stop discharging X capacitor XCAP. In one embodiment, when it is judged that input terminals IN1 and IN2 are connected to the DC power source, discharge module 303 stops working, e.g., be disabled.

In the embodiment of FIG. 7, DC voltage detection circuit 33 further comprises a sample and hold circuit 331 and a comparison circuit 332. Sample and hold circuit 331 has a first input terminal, a second input terminal and an output terminal, wherein the first input terminal of sample and hold circuit 331 is coupled to input terminals IN1 and IN2 through rectifier circuit 400, the second input terminal of sample and hold circuit 331 is coupled to the second output terminal of timing logic circuit 31 to receive sample control signal Ct1. Sample and hold circuit 331 is configured to sample the voltage across input terminals IN1 and IN2 and provide a sampled signal SHV based on sample control signal Ct1. Comparison circuit 332 receives sampled signal SHV, a bias signal Vbias, rectifier voltage HV, and detecting control signal Ctrl, and provides the second indicating signal FI2 via comparing rectifier voltage HV with sampled signal SHV when detecting control signal Ctrl is active, e.g., at logic high.

In one embodiment, timing logic circuit 31 further comprises a timing circuit 311 and a logic circuit 312. Timing circuit 311 is configured to provide the first timing signal T1, the second timing signal T2, and a third timing signal T3 based on the first indicating signal FI1 and the second indicating signal FI2. Logic circuit 312 is configured to provide detect control signal Ctrl, discharge control signal Ct2 and sample control signal Ct1 based on the first timing signal T1, the second timing signal T2, and the third timing signal T3.

Figure 8:
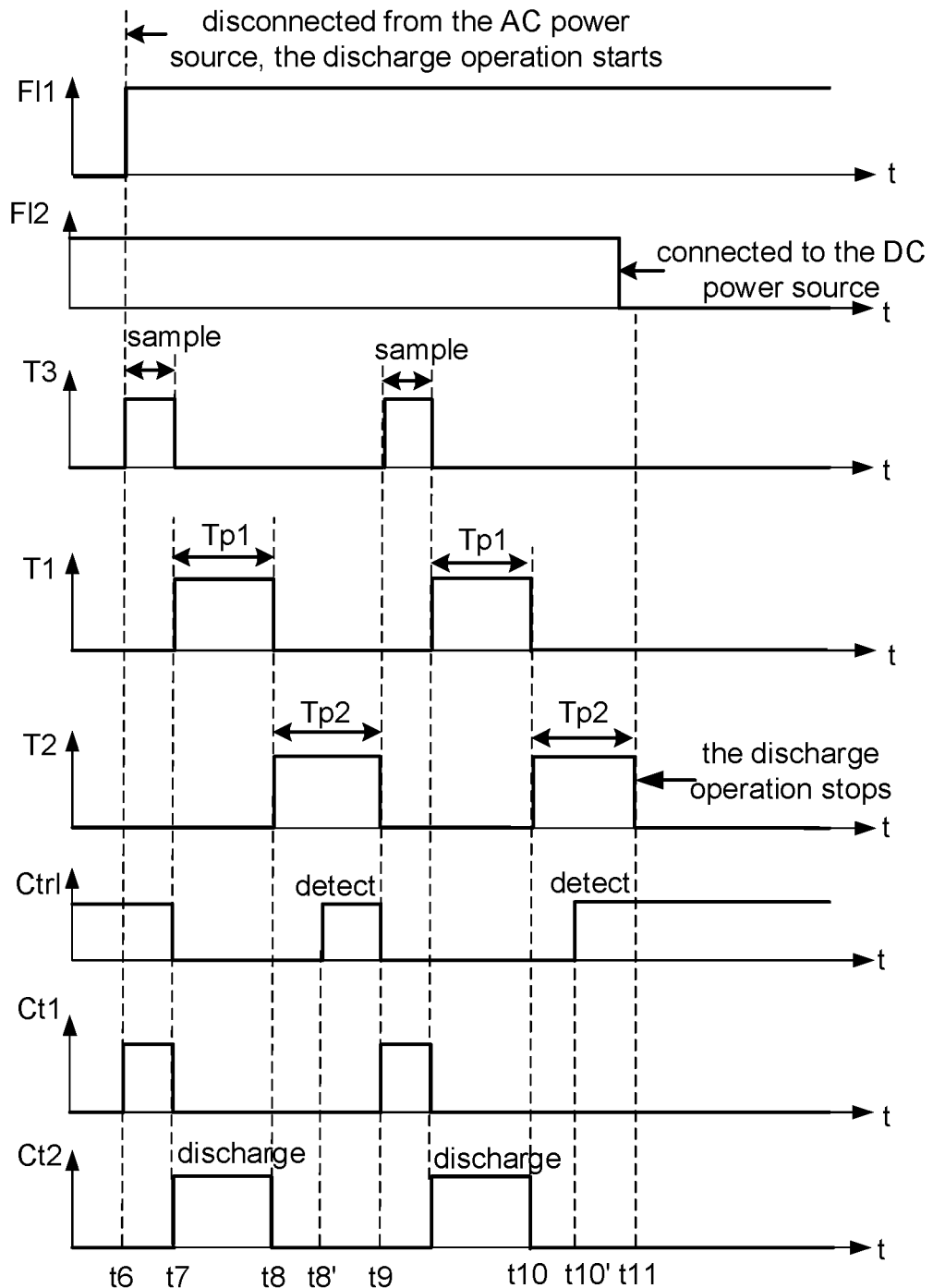
FIG. 8 shows waveforms of discharge module 303 shown in FIG. 7 according to an embodiment of the present invention.

FIG. 8 shows waveforms of discharge module 303 shown in FIG. 7 according to an embodiment of the present invention. FIG. 8 shows the first indicating signal FI1, the second indicating signal FI2, the third timing signal T3, the first timing signal T1, the second timing signal T2, detecting control signal Ctrl, sample control signal Ct1, and discharge control signal Ct2 from top to below. When switching converter 10 works normally, detecting control signal Ctrl is at logic high, AC detection circuit 302 is configured to detect the voltage across input terminals IN1 and IN2. At time t6, the first indicating signal FI1 becomes at logic high to indicate that input terminals IN1 and IN2 are disconnected from the AC power source, the discharge operation on X capacitor XCAP starts. Timing circuit 311 starts timing, the third timing signal becomes at logic high, sample control signal Ct1 becomes at logic high, sample and hold circuit 331 samples the voltage across input terminals IN1 and IN2, e.g., samples rectifier voltage HV and provides sampled signal SHV. At time t7, the first timing signal T1 becomes at logic high, discharge control signal Ct2 becomes at logic high, discharge component 22 starts to discharge X capacitor XCAP, detecting control signal Ctrl becomes at logic low. At time t8, the time period Tp1 during which the first timing signal T1 maintaining at logic high, the first timing signal T1 becomes at logic low, the second timing signal becomes at logic high, discharge control signal Ct2 becomes at logic low, and discharge component 22 stops discharge X capacitor XCAP. At the following time t8', detecting control signal Ctrl becomes at logic high, AC voltage detection circuit 302 is configured to detect the voltage across input terminals IN1 and IN2 and update the first indicating signal FI1 accordingly. Comparison circuit 332 compares sampled signal SHV with the voltage across input terminals IN1 and IN2, and updates the second indicating signal FI2 accordingly. In one embodiment, at least partial of the first time period Tp1 is between time t6 and t8. One with ordinary skill in the art should understand that sample and hold circuit 331 may sample the voltage across input terminals IN1 and IN2 before or during discharging X capacitor XCAP. In one embodiment, comparison circuit 332 is configured to provide the second indicating signal FI2 via comparing sampled signal SHV and rectifier voltage HV. When rectifier voltage HV is far less than sampled signal SHV, the second indicating signal FI2 indicates that input terminals IN1 and IN2 are disconnected from the DC power source. Otherwise, when rectifier voltage HV equals or is a little less than sampled signal SHV, the second indicating signal FI2 indicates that input terminals IN1 and IN2 are connected to the DC power source. In one embodiment, when rectifier voltage HV is larger than or equal to a difference between sampled signal SHV and a bias signal Vbias, the second indicating signal FI2 indicates that input terminals IN1 and IN2 are connected to the DC power source. In one embodiment, bias signal Vbias is slightly larger than zero volts. In one embodiment, bias signal Vbias is programmable. Timing logic circuit 31 is configured to judge whether input terminals IN1 and IN2 are connected to the AC power source based on the first indicating signal FI1, and judge whether input terminals IN1 and IN2 are connected to the DC power source based on the second indicating signal FI2. In the embodiment shown in FIG. 8, during a time period between time t8 and time t8', the first indicating signal FI1 is at logic high to indicate that input terminals IN1 and IN2 are disconnected from the AC power source, and the second indicating signal FI2 is at logic high to indicate that input terminals IN1 and IN2 are disconnected from the DC power source. In one embodiment, there is an interval between time t8 and time t8'. At time t9, timing circuit 311 restarts timing. Above operation repeats until time t11. At time t11, the second indicating signal FI2 becomes at logic low to indicate that input terminals IN1 and IN2 are connected to the DC power source, and then timing circuit 311 stops, the discharge operation on X capacitor XCAP stops.

Figure 9:
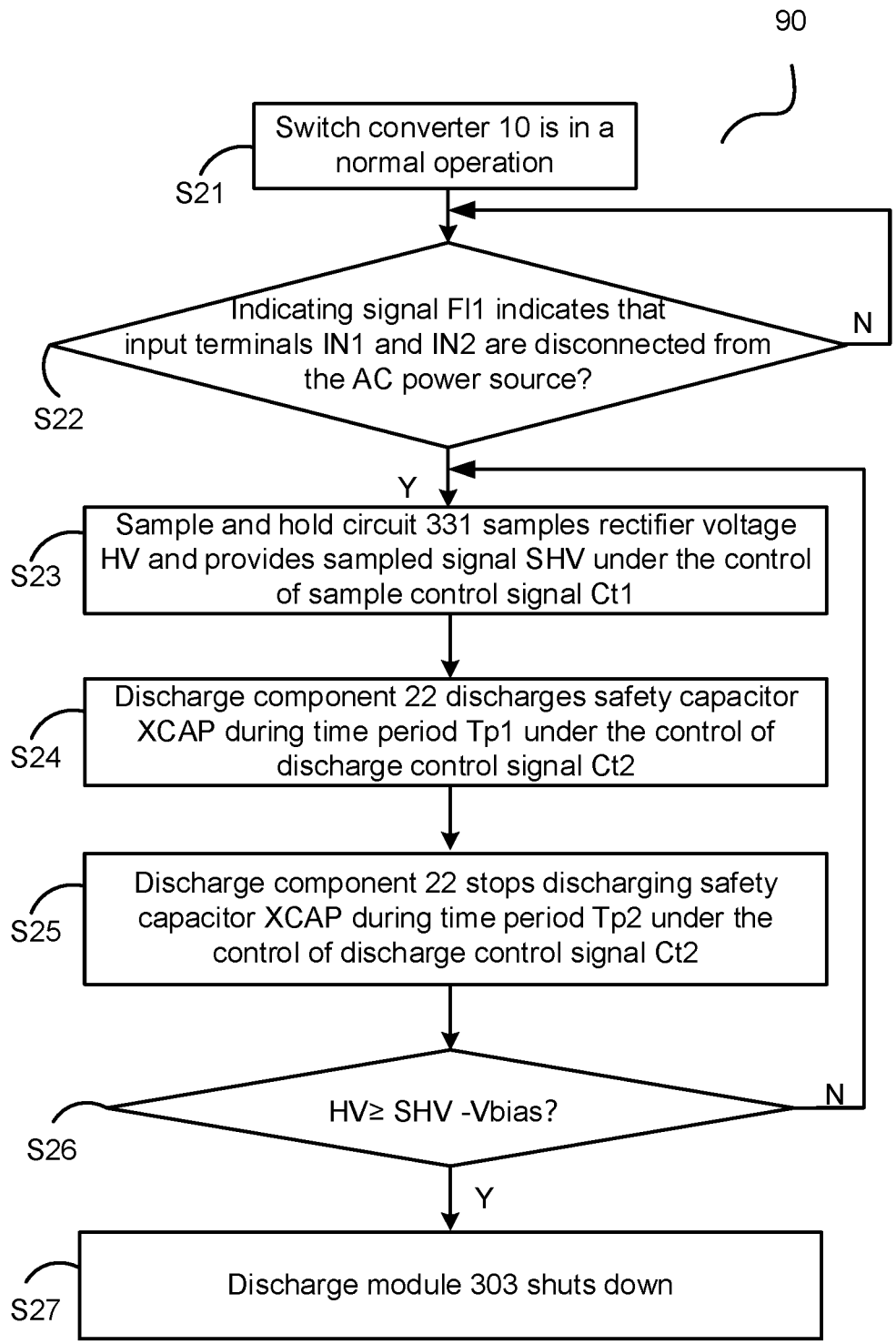
FIG. 9 shows a flow chart 90 of a discharge method of discharge module 303 shown in FIG. 7 according to an embodiment of the present invention.

FIG. 9 shows a flow chart 90 of a discharge method of discharge module 303 shown in FIG. 7 according to an embodiment of the present invention. The discharge method shown in FIG. 9 comprises steps S21-S27.

At step S21, switching converter 10 is in a normal operation.

At step S22, if the first indicating signal FI1 indicates that input terminals IN1 and IN2 are disconnected from the AC power source, then go to steps S23-S26, discharge module 303 conducts discharge operation on X capacitor XCAP, otherwise, if the first indicating signal FI1 indicates that input terminals IN1 and IN2 are connected to the AC power source, then continues step S22.

At step S23, sample and hold circuit 331 samples the voltage across input terminals IN1 and IN2 under control of sample control signal Ct1, e.g., provides sampled signal SHV via sampling rectifier voltage HV.

At step S24, during time period Tp1, discharge component 22 discharges X capacitor XCAP under control of discharge control signal Ct2.

At step S25, during time period Tp2, discharge component 22 stops discharge X capacitor XCAP under control of discharge control signal Ct2, and the voltage across input terminals IN1 and IN2 is compared with sampled signal SHV, e.g., comparing rectifier voltage HV with sampled signal SHV.

At step S26, when the voltage across input terminals IN1 and IN2 is close to or equal to sampled signal SHV, e.g., when HW≥SHV-Vbias, it is judged that input terminals IN1 and IN2 are connected to the DC power source, discharge module 303 stops the discharge operation on X capacitor XCAP, and then go to step S27.

At step S27, discharge module 303 shuts down, e.g., is disabled.

Figure 10:
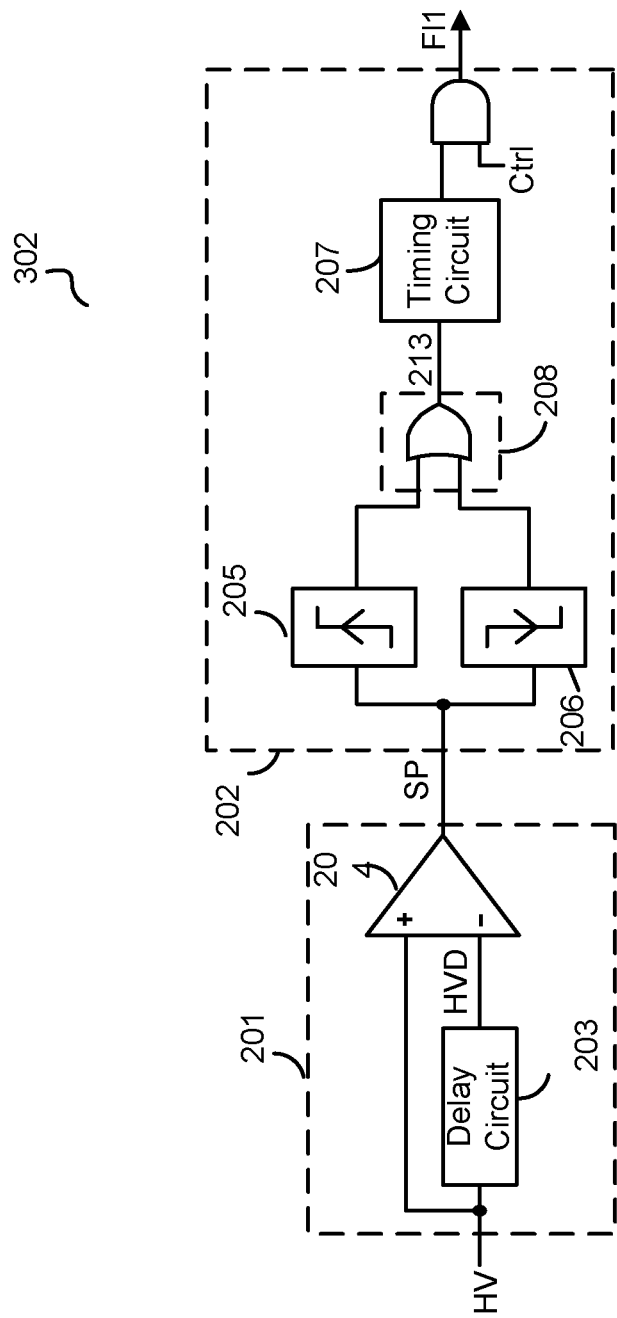
FIG. 10 schematically illustrates a circuit block of an AC voltage detection circuit 302 according to an embodiment of the present invention.

FIG. 10 schematically illustrates a circuit block of an AC voltage detection circuit 302 according to an embodiment of the present invention. As shown in FIG. 10, AC voltage detection circuit 302 comprises a detection circuit 201 and a power off indicating circuit 202. Detection circuit 201 has an input terminal and an output terminal, wherein the input terminal of detection circuit 201 is configured to receive rectifier voltage HV, and the output terminal of detection circuit 201 is configured to provide a square wave signal SP based on rectifier voltage HV. Power off indicating circuit 202 has an input terminal and an output terminal, wherein the input terminal of power off indicating circuit 202 is coupled to detection circuit 201 to receive square wave signal SP, and the output terminal of power off indicating circuit 202 is configured to provide the first indicating signal FI1 based on square wave signal SP.

In one embodiment, detection circuit 201 comprises a delay circuit 203 and a detecting comparator 204. Delay circuit 203 has an input terminal and an output terminal, wherein the input terminal of delay circuit 203 is configured to receive rectifier voltage HV, and the output terminal of delay circuit 203 is configured to provide a delayed rectifier voltage HVD. Detecting comparator 204 has a first input terminal (a non-inverting terminal), a second input terminal (an inverting terminal), and an output terminal, wherein the first input terminal of detecting comparator 204 is configured to receive rectifier voltage HV, the second input terminal of detecting comparator 204 is coupled to the output terminal of delay circuit 203 to receive delayed rectifier voltage HVD, and the output terminal of detecting comparator 204 is configured to provide square wave signal SP based on rectifier voltage HV and delayed rectifier voltage HVD.

In one embodiment, power off indicating circuit 202 further comprises a rising edge flip-flop 205, a falling edge flip-flop 206, an adder circuit 208, and a timing circuit 207. An input terminal of rising edge flip flop 205 is coupled to the output terminal of detection circuit 201 to receive square wave signal SP, and an output terminal of rising edge flip-flop is configured to provide a rising edge pulse signal at the rising edge of square wave signal SP. An input terminal of falling edge flip-flop 206 is coupled to the output terminal of detection circuit 201 to receive square wave signal SP, and an output terminal of falling edge flip-flop 206 is configured to provide a falling edge pulse signal at the falling edge of square wave signal SP. Adder circuit 208 has a first input terminal, a second input terminal, and an output terminal, wherein the first input terminal of adder circuit 208 is coupled to the output terminal of rising edge flip-flop 205, the second input terminal of adder circuit 208 is coupled to the output terminal of falling edge flip-flop 206, and the output terminal is configured to provide an adder pulse signal 213. An input terminal of timing circuit 207 is coupled to the output terminal of adder circuit 208 to receive adder pulse signal 213, an output terminal of timing circuit 207 is configured to provide the first indicating signal FI1 based on adder pulse signal 213. Timing signal 207 is configured to time based on adder pulse signal 213. In one embodiment, when an interval time period between pulses of adder pulse signal 213 is larger than a first predetermined value PT1, the first indicating signal FI1 indicates that input terminals IN1 and IN2 are disconnected from the AC power source. One of ordinary skill in the art should understand that detailed circuit structure of AC voltage detect circuit 302 is not limited by FIG. 10.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

I claim:

1. A discharge circuit for an X capacitor, the X capacitor is coupled between two input terminals of a switching converter, the discharge circuit comprising:
    a first voltage detection circuit, configured to provide a first indicating signal based on a voltage across the two input terminals of the switching converter, to indicate whether the two input terminals of the switching converter are connected to an AC power source; and
    a discharge module, coupled to the first voltage detection circuit to receive the first indicating signal, wherein when the first indicating signal indicates that the two input terminals of the switching converter are disconnected from the AC power source, the discharge module starts a discharge operation on the X capacitor; wherein
    the discharge operation comprises providing a sampled signal via sampling the voltage across the two input terminals of the switching converter, discharging the X capacitor during a first time period, and stopping discharging the X capacitor and comparing the sampled signal with the voltage across the two input terminals of the switching converter to judge whether the two input terminals of the switching converter are connected to the AC power source or a DC power source during a following second time period.

2. The discharge circuit of claim 1, wherein when the two input terminals of the switching converter are judged as be connected to the AC power source or the DC power source during the second time period, then the discharge circuit is configured to exit the discharge operation.

3. The discharge circuit of claim 1, wherein when the voltage across the two input terminals of the switching converter is larger than or equal to a difference between the sampled signal and a bias signal, the two input terminals of the switching converter are judged as be connected to the DC power source, and the discharge module is configured to stop the discharge operation.

4. The discharge circuit of claim 1, wherein the discharge module further comprises:
    a timing logic circuit, configured to receive a first indicating signal and a second indicating signal, and configured to provide a discharge control signal and a sample control signal based on the first indicating signal and the second indicating signal;
    a second voltage detection circuit, configured to receive the sample control signal, and configured to sample the voltage across the two input terminals of the switching converter and generate the sampled signal under control of the sample control signal, and the second voltage detection circuit is configured to provide a second indicating signal based on the sampled signal and the voltage across the two input terminals of the switching converter; and
    a discharge component, configured to discharge the X capacitor under control of the discharge control signal.

5. The discharge circuit of claim 4, wherein when the voltage across the two input terminals of the switching converter is larger than or equal to a difference between the sampled signal and a bias signal, the second indicating signal indicates that the two input terminals of the switching converter are connected to the DC power source.

6. The discharge circuit of claim 4, wherein when the second indicating signal indicates that the two input terminals of the switching converter are connected to the DC power source, the discharge module shuts down.

7. The discharge circuit of claim 4, wherein the second voltage detection circuit further comprises:
    a sample and hold circuit, configured to receive the sample control signal, and configured to sampling the voltage across the two input terminals of the switching converter and providing the sampled signal based on the sample control signal; and
    a comparison circuit, configured to receive the sampled signal, and configured to provide the second indicating signal via comparing the sampled signal with the voltage across the two input terminals of the switching converter.

8. The discharge circuit of claim 1, wherein the discharge module further comprises:

a timing logic circuit, having an input terminal and an output terminal, wherein the input terminal of the timing logic circuit is coupled to the first voltage detection circuit to receive the first indicating signal, and the output terminal of the timing logic circuit is configured to provide a discharge control signal based on the first indicating signal; and a discharge component, configured to discharge the X capacitor based on the discharge control signal.

9. A discharge method for an X capacitor, the X capacitor is coupled between two input terminals of a switching converter, the discharge method comprising:

detecting whether the two input terminals of the switching converter are connected to an AC power source; and starting a discharge operation on the X capacitor if the two input terminals of the switching converter are detected as being disconnected from the AC power source; wherein the discharge operation further comprises providing a sampled signal via sampling a voltage across the two input terminals of the switching converter, discharging the X capacitor during a first time period, and stopping the discharging of the X capacitor and judging whether the two input terminals of the switching converter are connected to the AC power source or a DC power source based on the sampled signal and the voltage across the two input terminals of the switching converter during a following second time period.

10. The discharge method of claim 9, wherein the first time period is adjustable.

11. The discharge method of claim 9, wherein the second time period is adjustable.

12. The discharge method of claim 9, wherein when the two input terminals of the switching converter are judged as be connected to the AC power source or the DC power source during the discharge operation, then exiting the discharge operation.

13. The discharge method of claim 9, wherein when the voltage across the two input terminals of the switching converter is equal to or larger than a difference between the sampled signal and a bias signal, the two input terminals of the switching converter is judged as be connected to the DC power source, and exiting the discharge operation.

* * * * *